United States Patent [19]

Ejiri

[11] Patent Number: 4,823,980

[45] Date of Patent: Apr. 25, 1989

[54] ENAMELLED DOUBLE PAN

[75] Inventor: Tetsumi Ejiri, Seto, Japan

[73] Assignee: Ejiri Horo Kabushiki Kaisha, Owariasahi, Japan

[21] Appl. No.: 180,234

[22] Filed: Apr. 11, 1988

[30] Foreign Application Priority Data

Dec. 23, 1987 [JP] Japan ................. 62-326225

[51] Int. Cl.⁴ .................. A47J 27/10; B65D 1/40
[52] U.S. Cl. ...................... 220/408; 99/344; 99/403; 126/377; 126/388; 220/433; 220/446
[58] Field of Search ............... 99/342, 344, 403, 410, 99/413, 447, 449; 126/363, 373, 376–378, 388; 220/405, 408, 410, 431, 433, 446, 469

[56] References Cited

U.S. PATENT DOCUMENTS

| 525,933 | 9/1894 | Wood | 126/377 |
| 609,740 | 8/1898 | Gillett | 126/377 |
| 1,364,115 | 1/1921 | Kania | 126/377 |
| 3,069,043 | 12/1962 | Bishop | 220/446 |
| 3,372,694 | 3/1968 | Vehse | 126/369 |
| 3,934,748 | 1/1976 | Racz | 220/431 |
| 4,331,127 | 5/1982 | Grosso | 126/377 |

FOREIGN PATENT DOCUMENTS

| 0988312 | 5/1976 | Canada | 99/403 |
| 3513338 | 10/1986 | Fed. Rep. of Germany | 99/403 |
| 2371172 | 7/1978 | France | 220/408 |
| 0139621 | 3/1920 | United Kingdom | 126/378 |
| 1302875 | 1/1973 | United Kingdom | 99/403 |

Primary Examiner—Jimmy G. Foster
Attorney, Agent, or Firm—Paul L. Sjoquist

[57] ABSTRACT

An enamelled double pan includes an outer pan member and an inner pan member. The outer pan member has an open top, a peripheral flange formed on the open top, and a handle mounted on an outer side surface thereof. The outer pan member is coated with an enamel layer. The inner pan member has an open top and a peripheral flange formed on the open top. The inner pan member is coated with an enamel layer, and is received in the outer pan member with a space defined therebetween for reserving water. The space is covered at its upper end with the peripheral flange of the inner pan member. A packing is provided between the peripheral flange of the outer pan member and the peripheral flange of the inner pan member. A clamping ring is provided for clamping the peripheral flange of the outer pan member and the peripheral flange of the inner pan member. A water filler aperture is formed in the peripheral flange of the inner pan member for filling the water into the space.

10 Claims, 4 Drawing Sheets

ENAMELLED DOUBLE PAN

BACKGROUND OF THE INVENTION

The present invention relates to an enamelled double pan, namely, a double pan covered with an enamel layer.

Generally, matter such as milk and frozen food is heated in a water bath wherein a small pan containing the matter is received in a large pan containing water, and the large pan is heated.

However, the conventional heating in such a water bath requires a set of large and small pans, and is troublesome to carry out.

SUMMARY OF THE INVENTION

Accordingly, it is an object of the present invention to provide an enamelled double pan which is easily water bathed and which has an improved appearance.

It is another object of the present invention to provide an enamelled double pan which is resistant to rust and which is easily cleaned.

It is a further object of the present invention to provide an enamelled double pan in which an inner and an outer pan member are easily assembled.

According to the present invention, there is provided an enamelled double pan comprising an outer pan member and an inner pan member. The outer pan member has an open top, a peripheral flange formed on the open top, and a handle mounted on an outer side surface thereof. The outer pan member is coated with an enamel layer. The inner pan member has an open top and a peripheral flange formed on the open top. The inner pan member is coated with an enamel layer, and is received in the outer pan member with a space defined therebetween for reserving water. The space is covered at its upper end with the peripheral flange of the inner pan member. A packing is provided between the peripheral flange of the outer pan member and the peripheral flange of the inner pan member. A clamping ring is provided for clamping the peripheral flange of the outer pan member and the peripheral flange of the inner pan member. A water filler aperture is formed in the peripheral flange of the inner pan member for filling the water into the space.

The invention will be more fully understood from the following detailed description and appended claims when taken with the drawings.

DETAILED DESCRIPTION OF THE PREFERRED EMBODIMENT

Figure 1:
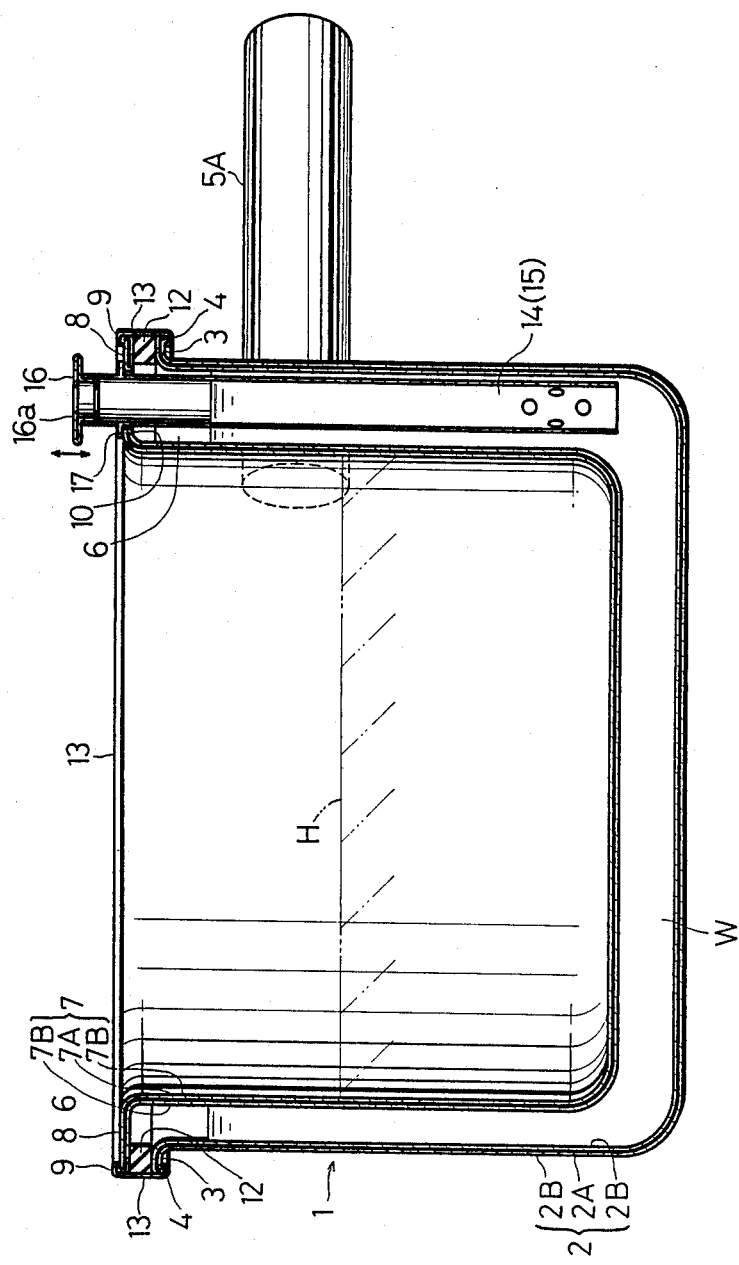
FIG. 1 is a vertical sectional view of the enamelled double pan of a preferred embodiment of the present invention.

Referring now to FIG. 1 which shows a vertical sectional view of an enamelled double pan 1, the pan 1 has a double structure wherein an outer pan member 2 and an inner pan member 7 are assembled with each other, and a space 6 for receiving water W therein is defined between the pan members 2 and 7. The outer pan member 2 comprises a base plate 2A made of steel and shaped by a press into a desired configuration having a circular open top formed with a peripheral flange 3 having a downward projection 4 at an outer edge thereof. Further, a mount 5 for a handle 5A is welded to an outer side surface of the base plate 2A, and enamel layers 2B are baked on opposite surfaces of the base plate 2A.

Similarly, the inner pan member 7 comprises a base plate 7A made of steel and shaped by a press into a desired configuration having a circular open top smaller in diameter than the outer pan member 2. The open top is formed with a peripheral flange 8 for covering the space 6 defined between the inner pan member 7 and the outer pan member 2. The peripheral flange 8 is formed with a water filler aperture 10 for filling the water W into the space 6 and a small steam aperture 11 near the water filler aperture 10 for releasing steam to be generated in the space 6. The base plate 7A is enamel-baked to provide enamel layers 7B on opposite surfaces thereof.

Figure 2:
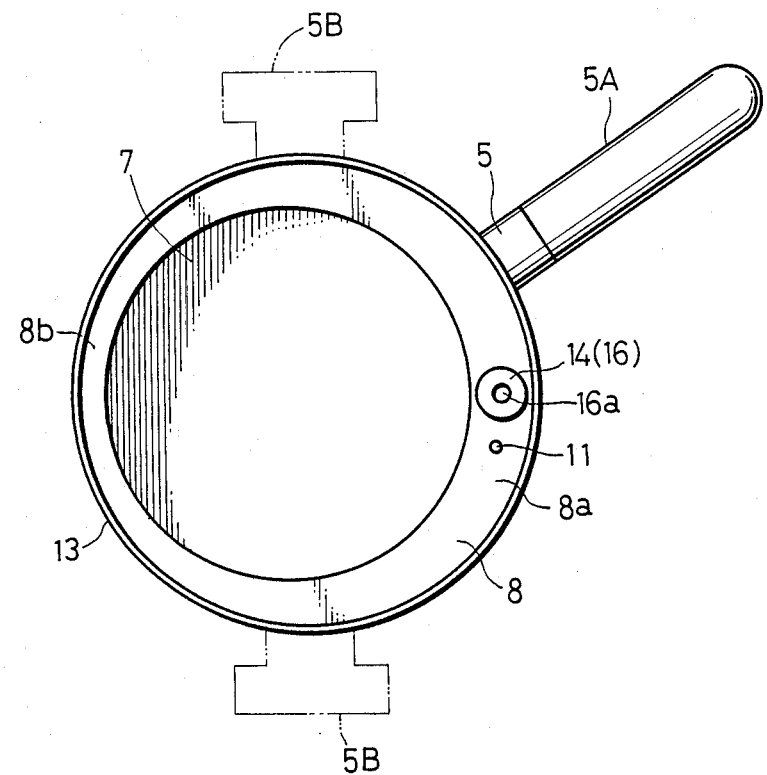
FIG. 2 is a plan view of the enamelled double pan shown in FIG. 1.

As shown in FIG. 2, the inner pan member 7 is located in eccentrical relationship with the outer pan member 2, so that the peripheral flange 8 of the inner pan member 7 has a wide portion 8a and a narrow portion 8b. The water filler aperture 10 and the small steam aperture 11 are formed in the wide portion 8b of the peripheral flange 8 apart from the location of the mount 5 for the handle 5A.

The enamel layer 2B and 7B of the outer pan member 2 and the inner pan member 7 are formed on the base plates 2A and 7A, respectively, by a conventional baking method. The formation of the enamel layers 2B and 7B was carried out in the following manner:

The base plates 2A and 7A were degreased with an organic solvent or an alkaline liquid for 5 minutes, and washed with water for 3 minutes. The base plates were then pickled with a 10% sulfuric acid for 7 minutes, and washed with water for 5 minutes. The base plates were then nickel-treated by immersing same in a 13 g/l nickel sulfate solution for 5 minutes, and washed with water for 5 minutes. The base plates were then neutralized for 5 minutes by immersing same in a solution of 1.2 g of hydrated borax and 3.6 g of soda ash per liter, and dried at 120°–130° C. for 5 minutes. Then, an underglaze shown in the Table below was applied on the base plates, and baked at 800°–840° C. for 4 minutes. The thickness of the underglaze was 80–100 μm. Then, an upperglaze of titanium white shown in the Table was applied on the underglaze, and after drying, it was baked at 800°–840° C. for 4 minutes. The whole thickness of the glaze (enamel layers 2 B and 7 B) after baking was 200–230 μm. Thus, the enamel layers 2B and 7B were formed uniformly and yet beautifully on both surfaces of the outer pan member 2 and the inner pan member 7.

TABLE

| Raw Materials | Underglaze | Upperglaze |
| --- | --- | --- |
| Silica | 20.5 | 48.0 |
| Feldspan | 7.0 | — |
| Borax | 8.35 | 25.0 |
| Soda Ash | 4.9 | — |
| Cryolite | 2.5 | — |
| Sodium Silicofluoride | — | 1.3 |
| Sodium Nitrate | 0.7 | 5.7 |
| Cobalt Oxide | 1.1 | — |
| Nickel Oxide | 1.4 | — |
| Manganese Dioxide | 0.4 | — |
| Titanium Oxide | — | 20.0 |
| Clay | 7.0 | 5.0 |
| Hydrated Borax | 0.5 | — |
| Sodium Nitrite | 0.25 | — |
| Potassium Chloride | — | 0.25 |
| Water | 50.0 | 47.0 |

Figure 3:
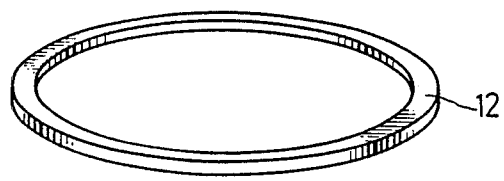
FIG. 3 is a perspective view of the annular packing shown in FIG. 1.

In assembling the outer pan member 2 with the inner pan member 7, the outer pan member 2 having the enamel layers 2B as mentioned above is put on a rotating table (not shown) with its upper opening directed upward, and an annular packing 12 (FIG. 3) having an outer diameter equal to that of the peripheral flange 3 is positioned on the peripheral flange 3. Then, the inner pan member 7 having the enamel layers 7B as mentioned above is inserted into the outer pan member 2 until the peripheral flange 8 of the inner pan member 7 abuts on the annular packing 12.

Figure 4:
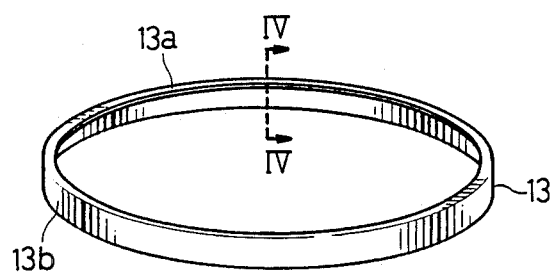
FIG. 4 is a perspective view of the clamping ring shown in FIG. 1.
Figure 5:
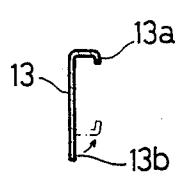
FIG. 5 is an enlarged sectional view taken along the line V—V in FIG. 4.
Figure 6:
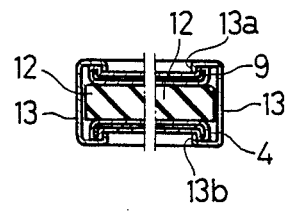
FIG. 6 is a sectional view of the clamping ring as it is clamped.

Then, a clamping ring 13 is fitted around the peripheral flange 3 of the outer pan member 2 and the peripheral flange 8 of the inner pan member 7. The clamping ring 13 is preferably formed of rust resistant material, such as stainless steel, with the inner inwardly directed edge portion 13a thereof adapted to be clamped to the peripheral flange 8 of the inner pan member 7 (FIGS. 4 and 5). Then, the clamping ring 13 fitted around the flanges 3 and 8 is clamped by a clamping means of a ring winding machine, the lower edge portion 13b thereof being bent inwardly as depicted by the arrow in FIG. 5. Thus, both the flanges 3 and 8 are fixed by the clamping ring 13 with the annular packing 12 interposed therebetween. That is, as shown in FIG. 6, the upper edge portion 13a and the lower edge portion 13b of the clamping ring 13 are retentively engaged with the projection 9 of the peripheral flange 8 and the projection 4 of the peripheral flange 3, respectively, thereby firmly fixing the inner pan member 7 to the outer pan member 2.

Then, the handle 5A is fitted to the mount 5 of the outer pan member 2. As shown in FIG. 2, the rod-like handle 5A may be replaced by a pair of handles 5B shown by phantom lines. The pair of handles 5B are located at opposite positions with the water filler aperture 10 and the steam aperture 11 positioned intermediate of the handles 5B. Further, the rod-like handle 5A may be located at a position where either of the handles 5B is located.

With reference to FIG. 1, the double pan 1 is provided with an alarm 14 for preventing idle heating under the condition where the water W is absent in the space 6. The alarm 14 comprises a cylindrical body 15 to be inserted through the water filler aperture 10 into the space 6 and a sounding member 16 fixed to the upper end of the cylindrical body 15. The cylindrical body 15 is formed with a flange 17 to be engaged with the peripheral flange 8 of the inner pan member 7, so that the length of insertion of the cylindrical body 15 is set to a desired length. The sounding member 16 is formed with a central vent hole 16a. In operation, when a level of the water W is lowered from the lower end of the cylindrical body 15 inserted into the space 6, the steam generated in the space 6 passes through the sounding member 16, thereby sounding an alarm to enable a user to be informed of the lowering of the level. The alarm 14 is formed of rust resistant material such as stainless steel.

In using the double pan 1 of this embodiment, the alarm 14 is removed, and the water W is filled to an upper level from the water filler aperture 10 into the space 6. Then, the cylindrical body 15 of the alarm 14 is inserted into the space 6. Then, matter H to be heated (e.g., milk) is put into the inner pan member 7, and the double pan 1 is heated by a heating means (not shown) to thereby heat the matter H in the inner pan member 1 without scorching same. When the level of the water W in the space 6 is lowered from a predetermined level in heating the double pan 1, the user is informed of such a condition by the alarm 14, thereby preventing idle heating under the condition where the water W is absent in the space 6. Further, as the handle 5A is mounted to the wide portion 8a of the peripheral flange 8 of the double pan 1 apart from the water filler aperture 10 and the steam aperture 11, the matter H is easily taken out of the narrow portion 8b of the peripheral flange 8 to another vessel by inclining the double pan 1. Furthermore, as the enamel layers 2B are formed on the inner and outer surfaces of the outer pan member 2, and the enamel layers 7B are formed on the inner and outer surfaces of the inner pan member 7, the appearance of the double pan 1 is improved, and the inner surface of the space 6 is prevented from being rusted.

Figure 7:
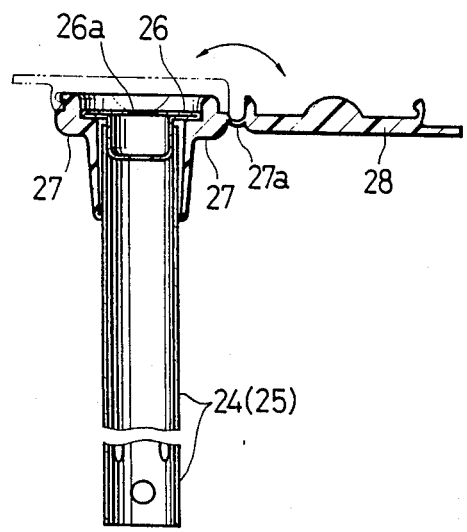
FIG. 7 is a modified form of the alarm according to the present invention.

FIG. 7 shows another embodiment of the alarm. As shown therein, an alarm 24 has a cap 28 for opening and closing a vent hole 26a of a sounding member 26. When the alarm 24 is required to be operated, the cap 28 is opened to operate the sounding member 26. The cap 28 is provided with a mount portion 27 mounted to the upper portion of a cylindrical body 25 and with a hinge portion 27a as a fulcrum of the cap 28. The cap 28, the mount portion 27 and the hinge portion 27a are formed of a heat resistant synthetic resin.

Having thus described the preferred embodiment of the invention, it should be understood that numerous structural modifications and adaptations may be made without departing from the spirit of the invention.

What is claimed is:

1. An enamel double pan comprising:

an outer pan member having an open top, a peripheral flange formed on said open top and a handle mounted on an outer side thereof, said outer pan member being coated with an enamel layer;

an inner pan member having an open top and a peripheral flange formed on said open top, said inner pan member being coated with an enamel layer, said inner pan member being received in said outer pan member with a space defined therebetween for reserving water, said peripheral flange covering an upper end of said space;

a packing provided between said peripheral flange of said outer pan member and said peripheral flange of said inner pan member;

a clamping ring for clamping said peripheral flange of said outer pan member and said peripheral flange of said inner pan member; and a water filler aperture formed in said peripheral flange of said inner pan member for filling the water into said space.

2. The enamelled double pan as defined in claim 1 further comprising a steam aperture formed in said peripheral flange of said inner pan member for releasing steam generated in said space upon heating said double pan.

3. The enamelled double pan as defined in claim 1, wherein said enamel layer is formed on opposite surfaces of said outer pan member and opposite surfaces of said inner pan member.

4. The enamelled double pan as defined in claim 1, wherein said outer pan member and said inner pan member are arranged in eccentrical relationship with each other to form a wide portion and a narrow portion on said peripheral flange of said inner pan member.

5. The enamelled double pan as defined in claim 4, wherein said water filler aperture is formed in said wide portion of said peripheral flange of said inner pan member, and said handle comprises a single rod-like handle located at a position apart from said water filler aperture in said wide portion.

6. The enamelled double pan as defined in claim 4, wherein said water filler aperture is formed in said wide portion of said peripheral flange of said inner pan member, and said handle comprises a pair of handles located at opposite positions with said water filler aperture positioned intermediate of said handles.

7. The enamelled double pan as defined in claim 1 further comprising an alarm releaseably mounted to said water filler aperture.

8. The enamelled double pan as defined in claim 7, wherein said alarm comprises a cylindrical body adapted to be inserted into said space and a sounding member located at an upper end of said cylindrical body, and wherein when a level of the water in said space is lowered from a predetermined level, said alarm is operated to sound an alarm.

9. The enamelled double pan as defined in claim 8, wherein said alarm further comprises a cap mounted to said sounding member for opening and closing said water filler aperture.

10. The enamelled double pan as defined in claim 8, wherein the length of said cylindrical body to be inserted into said space is adjustable.

* * * * *